United States Patent
Rothman et al.

(10) Patent No.: US 7,478,196 B2
(45) Date of Patent: Jan. 13, 2009

(54) FIRMWARE ENABLED TRAP-BASED RAID IMPLEMENTATION

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 11/231,944

(22) Filed: Sep. 21, 2005

(65) Prior Publication Data

US 2007/0067564 A1 Mar. 22, 2007

(51) Int. Cl.
G06F 12/00 (2006.01)
G06F 13/00 (2006.01)
G06F 13/28 (2006.01)

(52) U.S. Cl. .................................... 711/114; 711/154
(58) Field of Classification Search ................ None
See application file for complete search history.

(56) References Cited

U.S. PATENT DOCUMENTS 6,093,213 A * 7/2000 Favor et al. .................. 703/27

OTHER PUBLICATIONS

Via Technologies, Inc. "Via Launches VT8237R South Bridge, Driving Serial ATA and RAID into the Mainstream Market", Jul. 2, 2003, Via Technologies Press Release. http://www.via.com.tw/en/resources/pressroom/2003_archive/pr030702vt8237sb.jsp.*

RAID Without Additional Hardware: Do It Yourself With Windows 2000, IDE Vs. SCS1 RAID, tom's hardware guide, http:://www.tomshardware.com/howto/20010906/raid-02.html, Sep. 6, 2001.

RAID Without Additional Hardware: Do It Yourself With Windows 2000, Perfidies Of The Software RAID, tom's hardware guide, http:://www.tomshardware.com/howto/20010906/raid-04.html, Sep. 6, 2001.

Intel I/O Controller Hub 6 (ICH6) Family, Datasheet, For the Intel 82801FB ICH6, 82801FR ICH6R and 82801FBM ICH-M I/O Controller Hubs, Jan. 2005.

* cited by examiner

Primary Examiner—Kevin Verbrugge
Assistant Examiner—Eric S Cardwell
(74) Attorney, Agent, or Firm—Christopher K. Gagna (57) ABSTRACT

Disclosed is a system and method to provide a firmware enabled trap-based Redundant Array of Independent Disks (RAID) implementation for disk drives. A plurality of disk drives in a RAID system are coupled to a chipset. A trap is defined in the chipset for input/output (I/O) accesses to a disk drive of the RAID system. Firmware of the chipset determines if an I/O access is to one of the disk drives of the RAID system, and if so, commands a trapping operation. During the trapping operation, the firmware processes the I/O access to an appropriate disk drive of the RAID system.

9 Claims, 5 Drawing Sheets

SATA CONTROL REGISTER TRAP EXAMPLE (SATA-D31:F2)

ADDRESS OFFSET: C0h
DEFAULT VALUE: 00h
ATTRIBUTE: R/W
SIZE: 8 BITS

| BIT | DESCRIPTION |
|---|---|
| 7:4 | RESERVED |
| 3 | SECONDARY SLAVE TRAP (SST)—R/W. ENABLES TRAPPING AND SMI# ASSERTION ON LEGACY I/O ACCESSES TO 170h-177h AND 376h. THE ACTIVE DEVICE ON THE SECONDARY INTERFACE MUST BE DEVICE 1 FOR THE TRAP AND/OR SMI# TO OCCUR. |
| 2 | SECONDARY MASTER TRAP (SPT)—R/W. ENABLES TRAPPING AND SMI# ASSERTION ON LEGACY I/O ACCESSES TO 170h-177h AND 376h. THE ACTIVE DEVICE ON THE SECONDARY INTERFACE MUST BE DEVICE 0 FOR THE TRAP AND/OR SMI# TO OCCUR. |
| 1 | PRIMARY SLAVE TRAP (PST)—R/W. ENABLES TRAPPING AND SMI# ASSERTION ON LEGACY I/O ACCESSES TO 1F0h-1F7h AND 3F6h. THE ACTIVE DEVICE ON THE PRIMARY INTERFACE MUST BE DEVICE 1 FOR THE TRAP AND/OR SMI# TO OCCUR. |
| 0 | PRIMARY MASTER TRAP (PMT)—R/W. ENABLES TRAPPING AND SMI# ASSERTION ON LEGACY I/O ACCESSES TO 1F0h-1F7h AND 3F6h. THE ACTIVE DEVICE ON THE PRIMARY INTERFACE MUST BE DEVICE 0 FOR THE TRAP AND/OR SMI# TO OCCUR. |

FIG. 4A

IDE CONTROL REGISTER TRAP EXAMPLE (IDE-D31:F1)

ADDRESS OFFSET: C0h
DEFAULT VALUE: 00h
ATTRIBUTE: R/W
SIZE: 8 BITS

| BIT | DESCRIPTION |
|---|---|
| 7:2 | RESERVED |
| 1 | SLAVE TRAP (PST) — R/W. ENABLES TRAPPING AND SMI# ASSERTION ON LEGACY I/O ACCESSES TO 1F0h-1F7h AND 3F6h. THE ACTIVE DEVICE MUST BE THE SLAVE DEVICE FOR THE TRAP AND/OR SMI# TO OCCUR. |
| 0 | MASTER TRAP (PMT) — R/W. ENABLES TRAPPING AND SMI# ASSERTION ON LEGACY I/O ACCESSES TO 1F0h-1F7h AND 3F6h. THE ACTIVE DEVICE MUST BE THE MASTER DEVICE FOR THE TRAP AND/OR SMI# TO OCCUR. |

FIRMWARE ENABLED TRAP-BASED RAID IMPLEMENTATION

BACKGROUND

1. Field of the Invention

Embodiments of the invention relate generally to the field of computing systems, and more particularly, to a firmware enabled trap-based Redundant Array of Independent Disks (RAID) implementation.

2. Description of Related Art

A RAID system is generally defined as a disk system that provides increased performance and/or fault tolerance for a computer system by utilizing two or more disk drives in combination. Typically, a RAID system comprises a RAID controller and two or more disk drives. RAID functionality, in the past, has typically been built into a hardware-based RAID controller. However, today, RAID systems can now be implemented in computer systems via software.

Utilizing a RAID system, performance may be improved by disk striping, which interweaves bytes or groups of bytes across multiple disk drives, so that more than one disk drive is reading and writing simultaneously. Fault tolerance may be achieved by mirroring or parity.

Various levels of RAID systems are well known. For example, RAID level 0 refers to disk striping only, which interweaves data across multiple disks for better performance. However, RAID level 0 does not provide safeguards against failure. RAID level 1 utilizes disk mirroring which provides 100 percent duplication of data and offers very high reliability, but doubles storage cost. There are also a number of other different RAID levels that provide different types of fault tolerance levels (e.g. RAID levels 2, 3, 4, 5, 6, 10, etc.), as are known in the art.

In the past, RAID systems implemented via software in computers suffered from low efficiency and sub-par performance. However, with increasingly faster computers, the implementation of RAID systems has become more and more plausible.

Today, operating systems (OSs), such as Windows 2000, provide software-based RAID capability without the need for a separate hardware-based RAID controller. These software-based RAID mechanisms are supposed to allow a RAID system of multiple disk drives to be set-up in typical RAID fashion, in which, multiple disk drives are obscured to the OS, and a persistent description of only one logical RAID device is instead presented to the OS, such that the OS believes it is only dealing with one disk drive for input/output I/O transactions (e.g. read/write operations).

Unfortunately, computer systems are often unable to implement software-based RAID systems because of compatibility issues with respect to drivers of the operating system, different versions of OSs, and different OSs. Computer system users are increasingly finding that attempting to operate software-based RAIDs due to various compatibility issues is particularly burdensome and, often, computer system users quite simply cannot set up their personal computer system to run a software-based RAID.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention.

In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Figure 1:
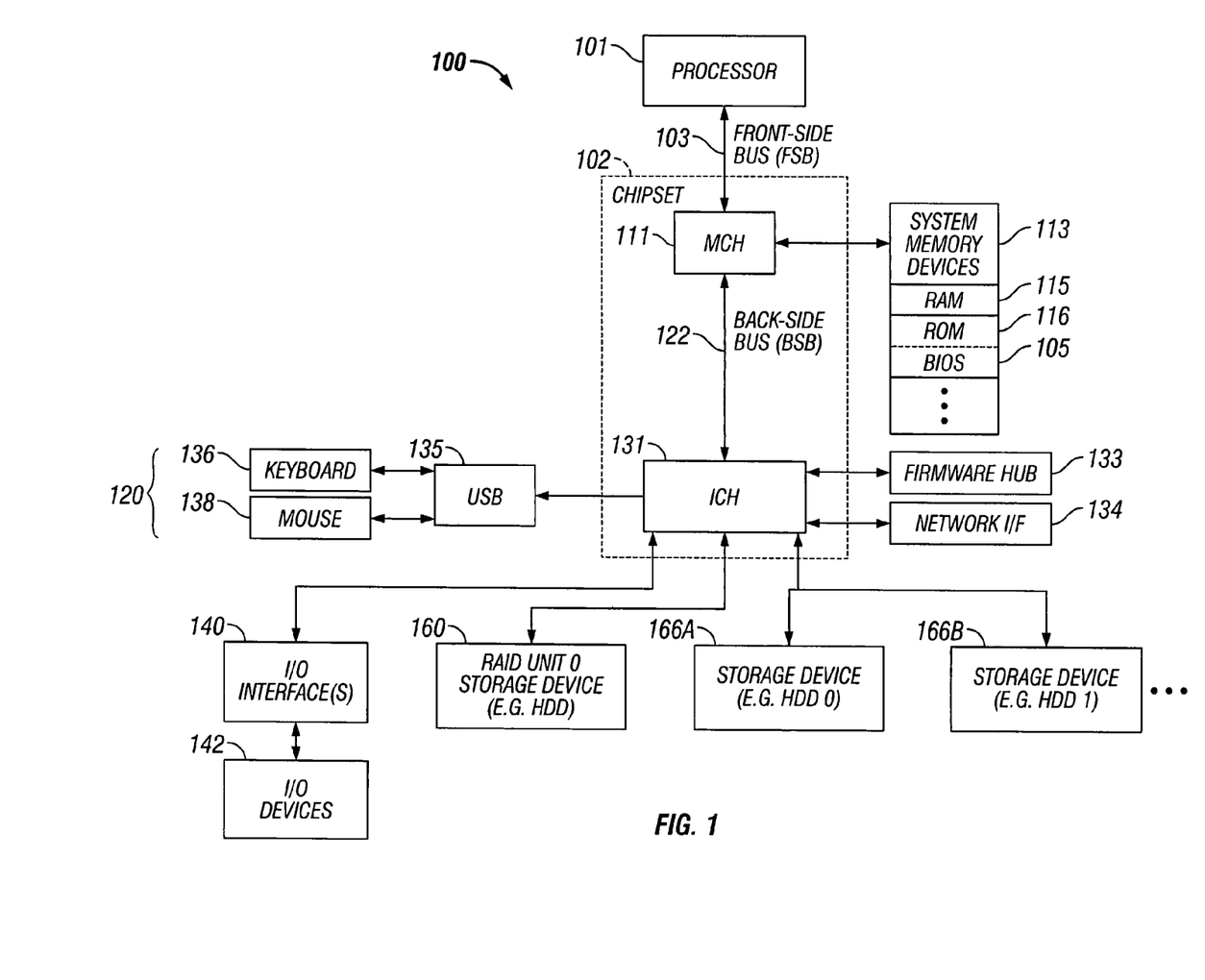
FIG. 1 shows a block diagram of an illustrative embodiment of an exemplary platform configuration in which embodiments of the invention can be practiced.

With reference to FIG. 1, FIG. 1 shows a block diagram of an illustrative embodiment of an exemplary platform configuration 100 in which embodiments of the invention can be practiced. The platform configuration 100 for a computer system includes at least one processor 101 such as a central processing unit (CPU), a chipset 102 which may include a memory control hub (MCH) 111 and an Input/Output (I/O) control hub (ICH) 131, a basic input/output system (BIOS) 105 stored in ROM, system memory devices 113, one or more interface devices 120, a firmware hub 133, a network interface 134, a Universal Serial Bus (USB) interface 135, and other I/O interfaces 140 and other I/O devices 142. The platform 100 may be any type of computing system. For example, the platform 100 may be a server computer, personal computer, network computer, mainframe, hand-held device, etc.

For the purposes of the present specification, the term "processor" refers to any machine that is capable of executing a sequence of instructions and shall be taken to include, but not be limited to, general purpose microprocessors, special purpose microprocessors, application specific integrated circuits (ASIC), multi-media controllers, signal processors and microcontrollers, etc.

In one embodiment, processor 101 is a CPU including a general-purpose microprocessor that is capable of executing an Intel® Architecture instruction set. For example, CPU 101 can be one of the PENTIUM classes of processors, or one of the ITANIUM classes of processors.

The CPU 101 may be coupled to the chipset 102 by a front-side bus (FSB) 103. As previously discussed, in one example, the chipset 102 may include an MCH 111 and an ICH 131, which are coupled to one another. The MCH 111 may be responsible for servicing memory transactions that target the system memory devices 113. The MCH 111 can be a stand-alone unit, an integrated part of a chipset, or a part of some larger unit that controls the interfaces between various system components and the system memory devices 113.

The system memory devices 113 can include any memory device adapted to store digital information, such as random access memory (RAM) 115 and read-only memory (ROM) 116. Examples of RAM include static random access memory (SRAM), dynamic random access memory (DRAM), synchronous dynamic random access memory (SDRAM), and double data rate (DDR) SDRAM or DRAM, etc. System memory devices 113 can also include non-volatile memory such as read-only memory (ROM) 116.

In one example, an ICH 131 of the chipset 102 may provide interface control between the MCH 111 and various I/O devices. Examples of such interfaces include a network interface 134 to interface the system 100 to a network (not shown), at least one USB port 135 that may be utilized to support USB devices 120 such as a USB keyboard 136 and a USB mouse 138, and one or more other I/O interfaces 140 to support various other types of I/O devices 142. I/O devices 142 include any I/O device to perform I/O functions.

For example, I/O interfaces 140 may include a peripheral component interconnect (PCI) interface as well as other types of interfaces.

I/O devices 142 may include a monitor, a keypad, a modem, a printer, storage devices (e.g. Compact Disk ROM (CD ROM), Digital Video Disk (DVD), hard drive, floppy drive, etc.) or any other types of I/O devices, e.g., input devices (mouse, trackball, pointing device), media cards (e.g. audio, video, graphics), etc.

Additionally, a firmware hub 133 may be coupled to the ICH 131 to provide firmware that may be implemented by ICH 131 and the rest of the computer system 100. The firmware hub 133, in one embodiment, may include flash memory to store the firmware.

Further, as shown in FIG. 1, a plurality of storage devices 160, 166A, and 166B may be coupled to the ICH 131 through suitable interfaces. As one example, these storage devices may be hard disk drives (HDDs) connected to the ICH through suitable interfaces, such as older Integrated Device Electronics (IDE) interfaces or newer serial interfaces, such as Serial Advanced Technology Attachment (SATA) interfaces.

Particularly, in the example shown in FIG. 1, a RAID unit (level 0) HDD 160 may be set up as the RAID device and other HDDs (HDD0 166A, HDD1 166B, etc.) may be utilized as part of the overall RAID system for storing information.

However, it should be appreciated that other types of storage devices (160, 166A, 166B, etc.), other than HDDs may be used in a RAID configuration, such as Compact Disk ROM (CD ROM) drives, Digital Video Disk (DVD) drives, optical drives, magneto optical drives, floppy drives, flash drives, etc.

In this example, a RAID level zero system is illustrated in which drive spanning and striping is supported. This is an example of a typical level 0 RAID system implementing drive spanning, in which an operating system (OS) only sees one logical HDD (e.g. HDD 160), and striping information is stored across the multiple HDDs (e.g. HDD 160, HDD 166A, HDD 166B, etc)).

As will be discussed, according to embodiments of the invention, a soft RAID capability may be provided through firmware of the platform 100 based upon pre-established IDE/SATA traps such that an OS independent soft RAID capability is provided. In this way, a persistent description of only one logical RAID device (e.g. RAID HDD 160) is provided to the remainder of the platform 100. This obviates the need for added hardware to support the RAID system and is a means by which the platform can reduce cost and utilize the increased speed of today's CPUs 101. Further, by utilizing platform firmware, instead of operating system software, this implementation can be completely OS independent and avoids the compatibility problems of software-based RAID systems.

As will be discussed, a system and method is disclosed to provide a firmware enabled trap-based Redundant Array of Independent Disks (RAID) implementation for disk drives, such as HDDs. A plurality of HDDs 160, 166A, 166B may be configured in a RAID implementation and the HDDs are coupled to chipset 102. A trap is established in the chipset 102 for input/output (I/O) accesses to HDDs of the RAID system. An I/O access may include a read or write access or another form of I/O access. Firmware of the chipset 102 determines if an I/O access is to one of the HDDs 160, 166A, 166B of the RAID system, and, if so, commands a trapping operation. During the trapping operation, the firmware processes the I/O access to an appropriate HDD of the RAID system in accordance with the RAID implementation.

Figure 2:
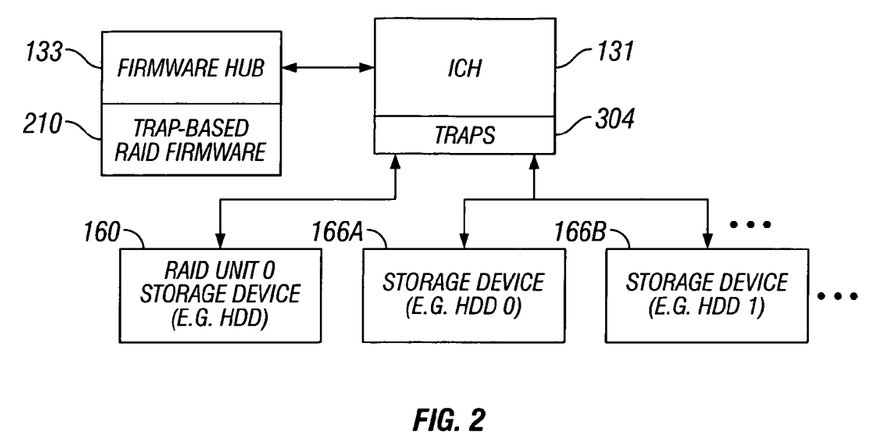
FIG. 2 is a block diagram illustrating various components of the firmware enabled trap-based RAID implementation, according to one embodiment of the invention.

Turning now to FIG. 2, FIG. 2 is a block diagram illustrating various components of the firmware enabled trap-based RAID implementation, according to one embodiment of the invention.

In this embodiment, firmware hub 133 stores a trap-based RAID firmware program 210 that in conjunction with pre-defined traps 304 of the ICH 131 provides a chipset-based IDE/SATA trapping mechanism to implement a RAID system consisting of hard disk drives 160, 166A, 166B, etc. in a manner that is independent of the OS.

The firmware, similar to prior hardware and software RAID implementations, provides a persistent description of only one logical RAID device, (e.g. RAID device 160). However, by utilizing platform firmware implemented by the chipset, instead of operating system software, an OS independent solution is provided that avoids compatibility and interoperability problems associated with different device drivers and operating systems.

The trap-based RAID firmware 210 based on ICH traps 304 takes advantage of the processing power of the CPU 101 while being agnostic as to the OS being used. The trap-based firmware methodology will be discussed in more detail below.

Figure 3:
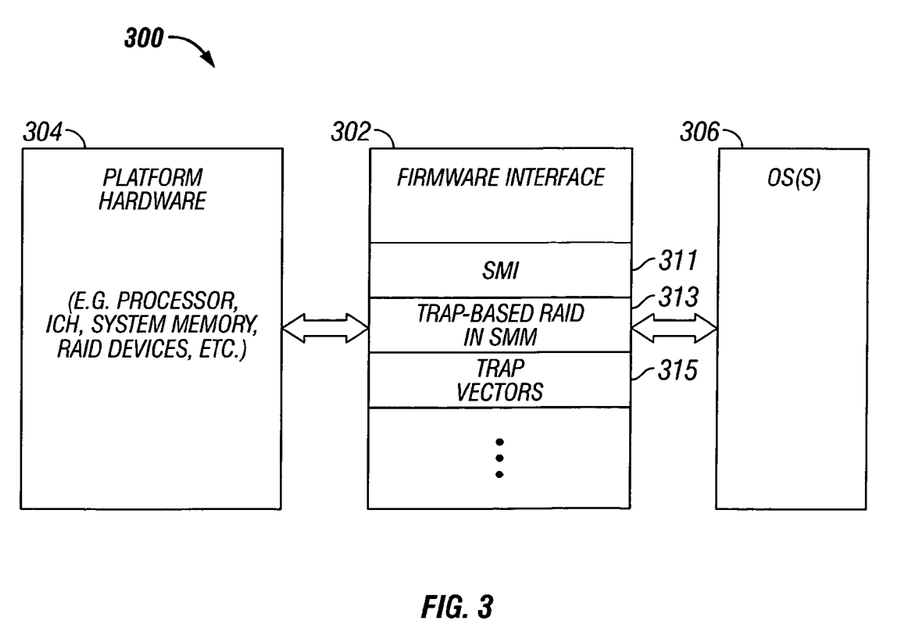
FIG. 3 is a block diagram illustrating how the firmware interfaces between platform hardware and the operating system and shows various functions utilized to accomplish a firmware enabled trap-based RAID implementation, according to one embodiment of the invention.

Referring now to FIG. 3, FIG. 3 is a block diagram illustrating how the firmware interfaces between platform hardware and the operating system and various features utilized to accomplish a firmware enabled trap-based RAID implementation, according to one embodiment of the invention.

Firmware interface 302 provided by the firmware 210 provides an interface between the OS 306 (or OSs) and the platform hardware 304 of the computer system. Together, these provide an environment for implementing firmware enabled trap-based RAID implementation. Firmware implemented by the chipset is seamlessly integrated with the platform to enable a trap-based RAID implementation.

As shown in FIG. 3, the system 300 may include a plurality of operating systems (OSs) 306. Firmware hub 133 may include trap-based RAID firmware 210 operable with the ICH 131 and other components of the chipset to enable boot services, run-time services and drivers to provide the requisite functionality for the firmware interface 302 and in order to implement soft RAID system functionality.

Platform hardware 304 may include the previously described CPU 101, chipset 102, system memory devices 113, as well as HDDs 160, 166A, 166B, etc. that form part of the RAID system.

Particularly, firmware interface 302 upon receipt of a system management interrupt (SMI) 311 may force the platform hardware 304 into a system management mode (SMM) 313. More particularly, a system management interrupt (SMI) 311 responsive to a read/write to a RAID HDD and an associated trap of the ICH may cause the platform hardware 304 to initiate a system management mode (SMM) in which trap-based RAID is performed by firmware 210. In this way, CPU 101 seamlessly passes control to the firmware interface 302 implementing the trap-based RAID firmware in a SMM and the ICH can then perform the read or write command to one of the RAID HDDs 160, 166A, 166B, etc.

Chipsets may include pre-established traps that are presently utilized for self-monitoring analysis, reporting, and smart disk recovery. Similarly, traps can be set in the ICH and in firmware interface 302 as trap vectors 315 which are pre-defined addresses that, when received by a chipset and/or ICH as part of a SMI, may point to a routine such as a routine to command a SMM in which RAID functionality is performed.

In accordance with one embodiment of the invention, an SMI 311 to read or write to an HDD operating as part of a pre-designated RAID system may be received based upon a trap in the ICH and the firmware implements a trap-based RAID component to implement RAID functionality in a SMM 313. Particularly, based upon the trap vector, firmware may perform a read/write operation to one of the HDDs of the RAID system during the SMM.

In this way a soft RAID implemented in firmware utilizing chipset-based trapping is provided. A persistent description of only one logical RAID device (e.g. RAID unit zero 160) is provided to the remainder of the platform 300 and a soft RAID read/write functionality implemented via firmware can be performed. RAID support is provided to the OS 306 in an agnostic manner such that firmware support for RAID functionality can be provided regardless of the OS being utilized.

Figure 4A:
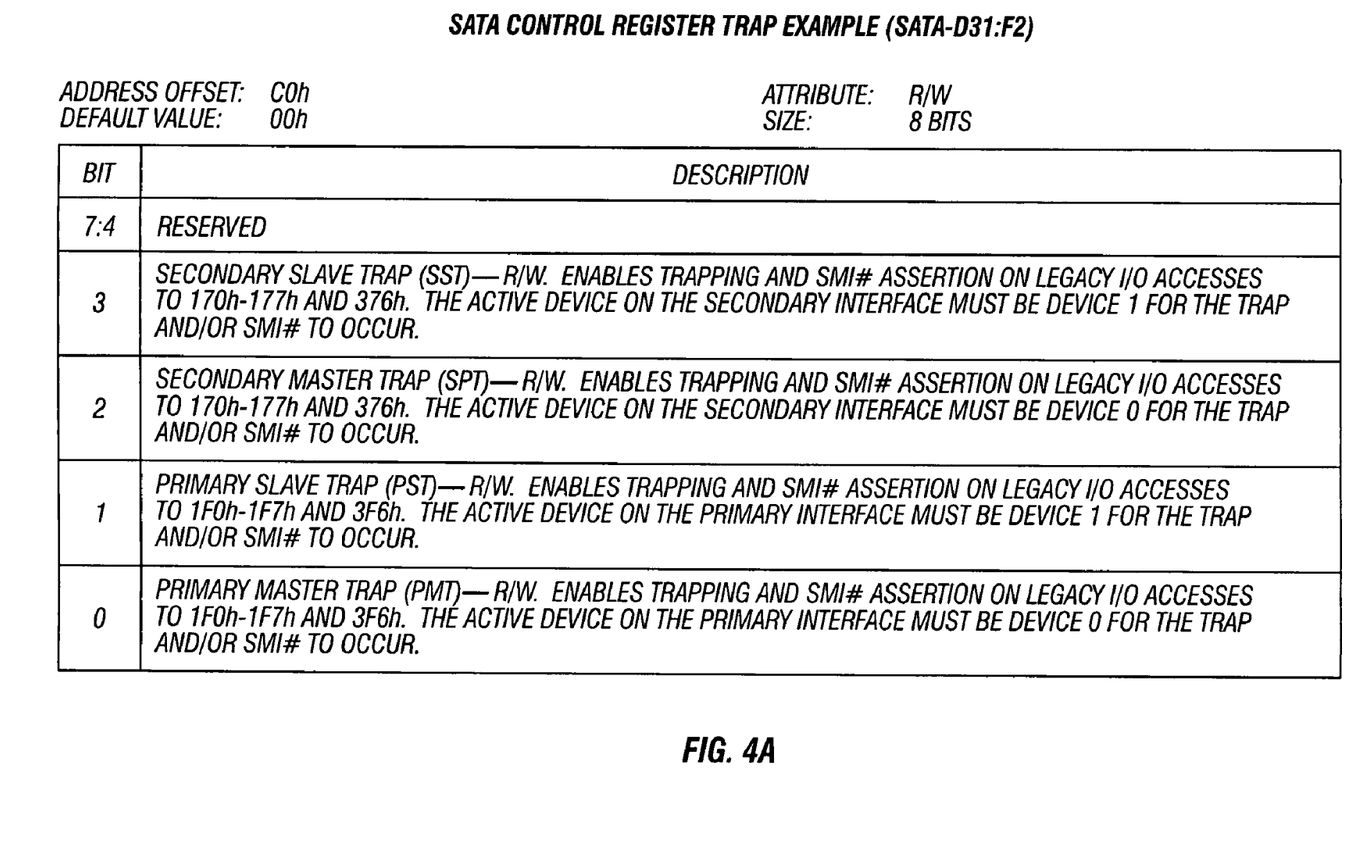
FIGS. 4A and 4B are tables illustrating examples of pre-existing SATA control register traps and IDE control register traps, according to one embodiment of the invention.
Figure 4B:
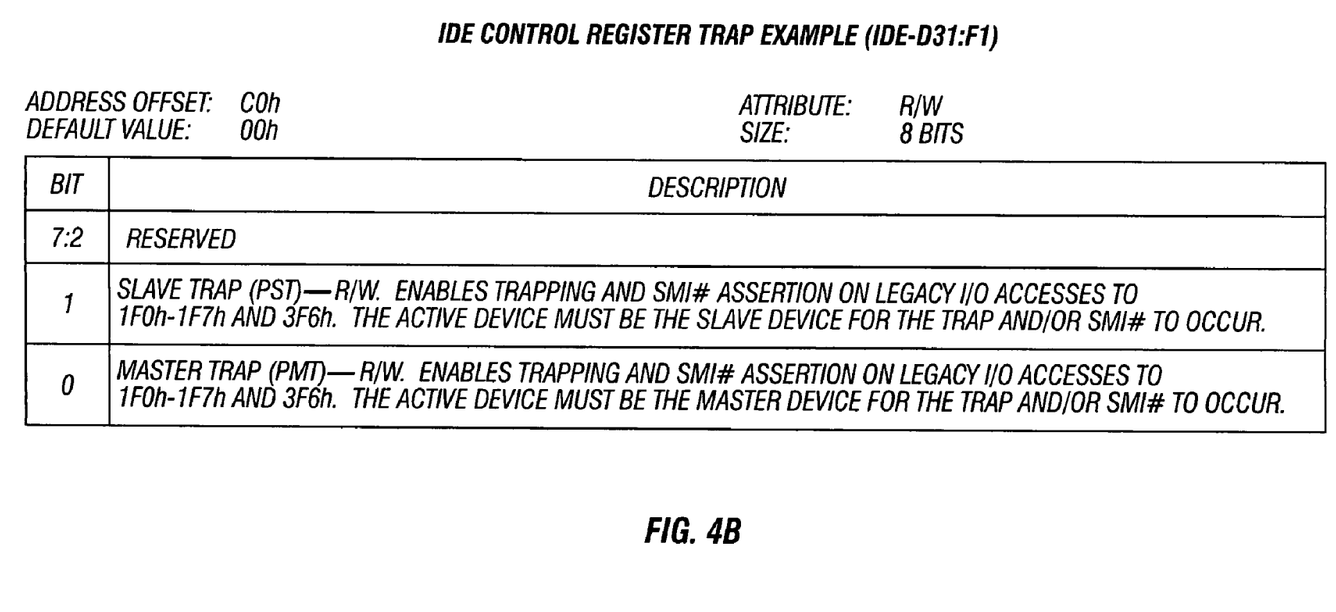

Turning briefly to FIGS. 4A and 4B, examples of pre-existing SATA control register traps and IDE control register traps are shown. These types of master and slave traps for both IDE and SATA read/writes enable trapping and SMI assertion for various I/O accesses. Thus, according to one embodiment of the invention, these pre-existing traps as well as other traps established in the ICH for RAID functionality may be utilized to assert the SMI and to enable the SMM and the trap-based RAID functionality and to enable reading and writing to a hard disk drive of a RAID system in an agnostic manner to the OS. The examples shown in FIGS. 4A and 4B are particular to the Intel® I/O controller hub 6 (ICH 6) family data sheet.

For example, as shown in FIG. 4A, when bits 0 or 1 are enabled during a legacy I/O SATA access for addresses 1F0h-1F7h and 3F6h received by the ICH, trapping is enabled and an SMI may be asserted. The trap-based RAID functionality that resides in SMM may then be enabled to allow for reading and writing to a hard disk drive of a RAID system in an agnostic manner to the OS.

Further, as shown in FIG. 4A, when bits 2 or 3 are enabled during a legacy I/O SATA access for addresses 170h-177h and 376h received by the ICH, trapping is enabled and an SMI may be asserted. The trap-based RAID functionality that resides in SMM may then be enabled to allow for reading and writing to a hard disk drive of a RAID system in an agnostic manner to the OS.

As another example shown in FIG. 4B, when bits 0 or 1 are enabled during a legacy IDE I/O access for addresses 1F0h-1F7h and 3F6h received by the ICH, trapping is enabled and an SMI may be asserted. The trap-based RAID functionality that resides in SMM may then be enabled to allow for reading and writing to a hard disk drive of a RAID system in an agnostic manner to the OS.

It should be appreciated that this is just one example of various types of traps that can be utilized to implement embodiments of the invention and that of wide variety of different traps and trap vectors for various sorts of processes and chipsets may be utilized.

Figure 5:
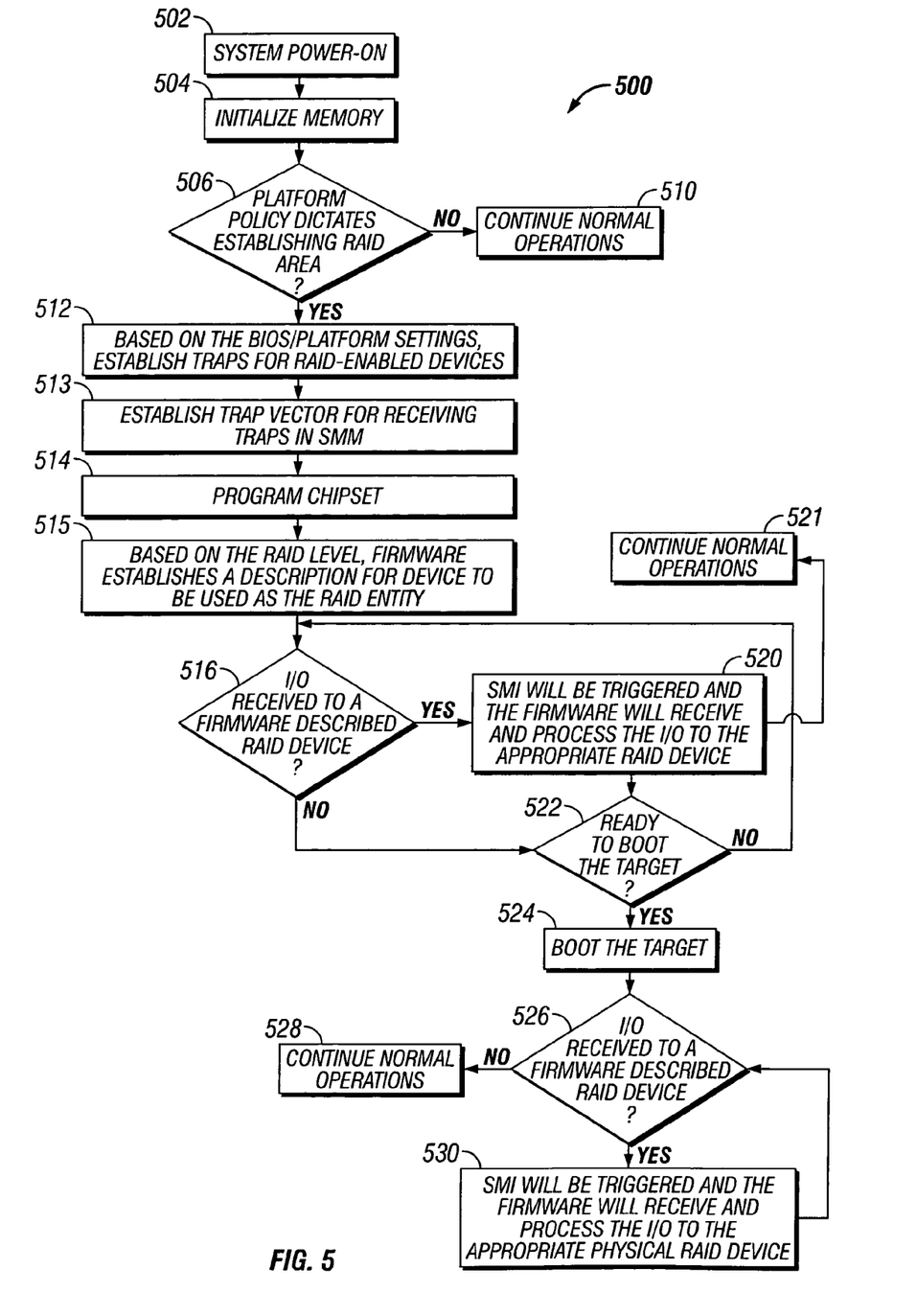
FIG. 5 is a flow diagram illustrating a firmware enabled trap-based RAID implementation process, according to one embodiment of the invention.

Turning now to FIG. 5, FIG. 5 is a flow diagram illustrating a firmware enabled trap-based RAID implementation process 500, according to one embodiment of the invention. As shown at block 502, the computer system or platform is powered on. Memories are initialized (block 504). Next, at decision block 506, platform policy dictates whether or not a RAID area should be established. This may include a common interface procedure in which a user is questioned as to whether or not they wish to establish a RAID across multiple hard disk drives and/or what level RAID should be utilized (e.g. whether striping is to be utilized, level of fault tolerance, mirroring, duplexing, etc). The creation of RAID systems for a computer is well known. Alternatively, a pre-existing RAID configuration may be automatically selected by the platform. If the platform policy does not dictate the establishment of a RAID area, normal operations are continued (block 510).

However, if a RAID area is established, next, based on BIOS and platform settings, traps are set up for RAID enabled devices. This includes traps in the ICH and trap vectors in the firmware interface. The use of traps in order to enable this firmware trap-based implementation has been previously discussed. Particularly, trap vectors for receiving traps in the system management mode (SMM) as part of the firmware implementation process are established (block 513). In order to implement the SMM trap-based RAID implementation in a SMM, the chipset including the ICH, MCH, and processor are programmed accordingly (block 514).

Based on the RAID level, the firmware establishes a description for a device that will be used as the RAID control entity (e.g. RAID HDD 160 (FIG. 1)).

Next, at decision block 516, the process 500 determines whether the I/O read/write request received is to a firmware described RAID device. If so, at block 520 a system management interrupt (SMI) is triggered by an ICH trap and the firmware interface utilizing a trap vector institutes trap-based RAID function in a SMM and processes the I/O read/write to the appropriate RAID device (block 520). Normal operations are then continued (block 521).

However, if the I/O request is not to a previously firmware described RAID device then at block 522 it is determined whether the target device is ready to be booted. If not, the process 500 moves back to decision block 516.

If the target is ready to be booted then at block 524 the target device is booted. Then, at block 526, the process 500 next determines whether the I/O read/write request received is to a firmware described RAID device. If so, at block 530, the SMI is triggered by an ICH trap and the firmware interface utilizing a trap vector institutes trap-based RAID function in a SMM and processes the I/O read/write operation to the appropriate RAID device. If not, normal operations are continued at block 528. It should be appreciated that after block 530, process 500 loops back to decision block 526 to repeatedly perform this check.

It should be appreciated that the trap-based RAID firmware to implement previously described process 500 may be implemented as a firmware driver that may be transferred to a user for installation in firmware on their platform.

Further, by using traps that are already established in a chipset, the firmware enabled RAID implementation is accomplished with the use of these traps (e.g. utilizing legacy IDE drive accesses or SATA drive accesses) seamlessly with existing OS software. In fact, this firmware enabled trap-based RAID implementation operates in a transparent fashion to the OS and is in fact OS agnostic.

By providing a platform-level soft RAID in firmware, compatibility and interoperability issues are avoided between different OSs and/or driver versions in the same OS. This firmware enabled trap-based RAID implementation additionally takes advantage of the increasing under-utilized bandwidth of modem CPUs. Additionally, new RAID levels can be added by merely augmenting the firmware.

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof.

When implemented in firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A method comprising:
    establishing a trap for input/output (I/O) accesses to a Redundant Array of Independent Disks (RAID) system having a plurality of disk devices, wherein trapping parameters for the trap are based upon pre-established trapping parameters associated with a platform including a processor of the platform, the pre-established trapping parameters being associated with a predetermined non-RAID legacy disk drive access operation, the RAID system being presented to an operating system as a single logical disk drive device;
    determining if the predetermined non-RAID legacy disk drive access operation has been requested, and if so, performing a trapping operation involving the trap, the trap being set as a trap vector in firmware, wherein the trapping operation including commanding a system management interrupt (SMI) based on the I/O access and, based on the SMI, a system management mode (SMM) is enabled in which the firmware processes the predetermined non-RAID legacy disk drive access operation by executing a RAID function associated both with the predetermined non-RAID legacy disk drive access operation and with the trap vector; and
    during the trapping operation, processing in the firmware as the predetermined non-RAID legacy disk drive access operation the RAID function.

2. The method of claim 1, wherein trapping parameters for the trap are based upon trapping parameters associated with an input/output control (ICH) of the chipset.

3. The method of claim 1, wherein the trapping parameters are associated with one of an integrated device electronics (IDE) HDD and a serial advanced technology attachment (SATA) HDD.

4. A system comprising:
    a chipset;
    a plurality of hard disk drives (HDDs) in a Redundant Array of Independent Disks (RAID) system coupled to the chipset;
    a trap defined in the chipset for input/output (I/O) accesses to the RAID system, wherein trapping parameters for the trap are based upon pre-established trapping parameters associated with a platform including a processor of the platform, the pre-established trapping parameters being associated with a predetermined non-RAID legacy disk drive access operation, the RAID system being presented to an operating system as a single logical disk drive device;
    wherein firmware of the chipset determines if the predetermined non-RAID legacy disk drive access operation has been requested, and if so, commands a trapping operation involving the trap, the trap being set as a trap vector in the firmware, wherein the trapping operation includes commanding a system management interrupt (SMI) based on the I/O access and based on the SMI, a system management mode (SMM) is enabled in which the firmware processes the predetermined non-RAID legacy disk drive access operation by executing a RAID function associated both with the predetermined non-RAID legacy disk drive access operation and with the trap vector; and
    during the trapping operation, the firmware processes as the predetermined non-RAID legacy disk drive access operation the RAID function.

5. The system of claim 4, wherein the trapping parameters are associated with an integrated device electronics (IDE) HDD standard.

6. The system of claim 4, wherein the trapping parameters are associated with a serial advanced technology attachment (SATA) HDD standard.

7. A machine-readable storage medium storing instructions, which when executed by a machine, cause the machine to perform the following operations comprising:
    establishing a trap for input/output (I/O) accesses to a Redundant Array of Independent Disks (RAID) system having a plurality of disk devices, wherein trapping parameters for the trap are based upon pre-established trapping parameters associated with a platform including a processor of the platform, the pre-established trapping parameters being associated with a predetermined non-RAID legacy disk drive access operation, the RAID system being presented to an operating system as a single logical disk drive device;
    determining if the predetermined non-RAID legacy disk drive access operation has been requested, and if so, performing a trapping operation involving the trap, the trap being set as a trap vector in firmware, wherein the trapping operation includes commanding a system management interrupt (SMI) based on the I/O access and, based on the SMI, a system management mode SMM is enabled in which the firmware processes the predetermined non-RAID legacy disk drive access operation by executing a RAID function associated both with the predetermined non-RAID legacy disk drive access operation and with the trap vector; and during the trapping operation, processing in the firmware as the predetermined non-RAID legacy disk drive access operation the RAID function.

8. The machine-readable storage medium of claim 7, wherein trapping parameters for the trap are based upon trapping parameters associated with an input/output control (ICH) of the chipset.

9. The machine-readable storage medium of claim 7, wherein the trapping parameters are associated with one of an integrated device electronics (IDE) HDD and a serial advanced technology attachment (SATA) HDD.

* * * * *